United States Patent [19]

Hsieh

[11] Patent Number: 4,636,303

[45] Date of Patent: Jan. 13, 1987

[54] BENEFICIATION OF DOLOMITIC PHOSPHATE ORES

[75] Inventor: Shuang-shii Hsieh, Florence, Ala.

[73] Assignee: Tennessee Valley Authority, Muscle Shoals, Ala.

[21] Appl. No.: 785,310

[22] Filed: Oct. 7, 1985

[51] Int. Cl.[4] .......... B01D 3/14

[52] U.S. Cl. .......... 209/167

[58] Field of Search .......... 209/166, 167

[56] References Cited

U.S. PATENT DOCUMENTS

| | | | |
|---|---|---|---|
| 2,105,807 | 1/1938 | Crago | 209/167 |
| 3,462,016 | 8/1969 | Bushell et al. | 209/166 |
| 4,287,053 | 9/1981 | Lehr et al. | 209/167 |
| 4,301,003 | 11/1981 | Hsieh | 209/166 |
| 4,324,653 | 4/1982 | Henchiri et al. | 209/167 |
| 4,436,616 | 3/1984 | Dufour et al. | 209/167 |
| 4,440,636 | 4/1984 | Lilley | 209/167 |
| 4,486,301 | 12/1984 | Hsieh et al. | 209/167 |

*Primary Examiner*—Bernard Nozick

*Attorney, Agent, or Firm*—Robert A. Petrusek

[57] ABSTRACT

A phosphate ore beneficiation process wherein phosphate ore containing coarse, weathered dolomite in the flotation feed thereof is subjected to beneficiation as follows: Said feed is sent to rougher phosphate flotation wherein it is treated with fatty acid and fuel oil and wherefrom is removed the coarse weathered dolomite in one or more cleaner phosphate flotations, without the use of additional flotation reagents added thereto, to thereby remove the coarse carbonate, i.e., dolomite fraction, which fraction would not otherwise float in subsequent carbonate flotation. In many instances this process effects reduction of the carbonate, as MgO contamination in the final concentrate, to less than about 1.0 percent by weight. Process feed can be prepared from the coarse pebble waste or the conventional flotation feed of the original phosphate matrix. After the acid-wash step there oftentimes is so little residual silica remaining to be removed from the resulting phosphate concentrate that the use of an amine circuit is not necessary. Rather, said resulting concentrate is directly subjected to carbonate flotation using alkyl diphosphonic acid as depressant and fatty acids as collector, with the phosphate values being recovered in the underflow therefrom.

10 Claims, 3 Drawing Figures

BENEFICIATION OF DOLOMITIC PHOSPHATE ORES

INTRODUCTION

The present invention relates to a phosphate ore beneficiation process and more particularly, the present invention relates to a process for beneficiating phosphate ores containing coarse, weathered dolomite in the flotation feed thereof.

BACKGROUND OF THE INVENTION

1. Field of the Invention

Current beneficiation practices for phosphate ores commonly utilize flotation as the principal step for separating phosphates from gangue minerals. The "Crago" or "double float" froth flotation process is commercially used for beneficiating such phosphate ores in which silica and silicate minerals are the predominant constituents of gangues. That process consists of conditioning the material with fatty acids and fuel oil, flotation of phosphate minerals, deoiling with sulfuric acid to remove the reagents, and refloating with amine reagents to remove the siliceous gangue which either floated or was trapped in the rougher float (U.S. Pat. No. 2,293,640).

However, many phosphate ores of potential commercial value contain carbonate gangue mineral matter in addition to siliceous minerals. These carbonate mineral impurities include dolomite, calcite, dolomitic limestone, seashell, and other less common carbonate-type minerals. Such mineral impurities not only dilute the $P_2O_5$ content of the phosphate ore concentrate, but also may interfere in subsequent chemical processing thereof. For example, carbonate minerals present in phosphate ore concentrates used to produce phosphoric acid, superphosphate, or triple superphosphate consume acid reagents in the acidulation steps without providing additional fertilizer values. They aggravate foam formation in the reactor vessel. The presence of dolomite or dolomitic limestone in the phosphate ore concentrate is particularly important because relatively small amounts of magnesium (i.e. $>1$ percent MgO) may cause technical problems in current wet-process acid chemical plants due to increased viscosity of acid, increased defoamer usage, scale and sludge formation, and possibly difficulty in maintaining a standard diammonium phosphate (DAP) fertilizer grade.

The "double float" process has generally been ineffective for beneficiating such high carbonate phosphate ores. Collectors such as fatty acids used for phosphate minerals generally float carbonate minerals as well, and it is only by the employment of suitable selective depressants of either phosphate or carbonate gangue that adequate selectivity can be obtained.

2. Description of the Prior Art

Methods of beneficiating phosphate ores containing carbonate and siliceous gangue materials are described in the following U.S. Pat. Nos.: 3,259,242, Snow, July 1966; 3,462,016, Bushell et al, August 1969; 3,462,017, Bushell et al, August 1969; 3,807,556, Johnston, May 1974; 4,144,969, Snow, March 1979; 4,189,103, Lawver et al, February 1980; 4,287,053, Lehr et al, September 1981; 4,317,715, Kintikka et al, March 1982; 4,364,824, Snow, Dec. 21, 1982; and 4,372,843, Lawver et al., February 1983. Each of these patents deals with processes that differ from the present invention, as for example: Snow, in U.S. Pat. No. 3,259,242 supra describes the beneficiation of a macro-crystalline apatite-calcite mixture which utilizes a cationic flotation to collect apatite as a float concentrate. Bushell et al, in U.S. Pat. No. 3,462,016 supra, teaches the use of $H_3PO_4$ and Bushell et al in U.S. Pat. No. 3,462,017 supra teach the use of $NH_4H_2PO_4$, both as phosphate mineral depressants for beneficiating carbonate-bearing phosphate rock. Johnston, in U.S. Pat. No. 3,807,556 supra further teaches the use of soluble sulfate salts such as $Na_2SO_4$ or $(NH_4)_2SO_4$ to reduce the loss of soluble phosphate in the processes of U.S. Pat. Nos. 3,462,016 and 3,462,017 supra.

The use of an apatite-collecting cationic reagent and a liquid hydrocarbon is described in U.S. Pat. No. 4,144,969 and 4,189,103 supra. These patents describe a phosphate ore beneficiating process in which the deslimed ore is first subjected to a "double float" froth flotation as described in U.S. Pat. No. 2,293,640, Crago, Aug. 18, 1942, to remove siliceous gangue. The float product containing apatite with dolomite impurities is then conditioned with a cationic agent and a liquid hydrocarbon to concentrate apatite as float.

Hintikka et al, in U.S. Pat. No. 4,317,715 supra describe two alternative processes to separate phosphate minerals from carbonate minerals after phosphate and carbonate minerals are concentrated from silicates; (1) the combined phosphate-carbonate concentrate is treated with a base, whereafter phosphate mineral is floated with a cationic collector, or (2) the combined phosphate-carbonate concentrate is treated with $SO_2$ or $CO_2$ to recover phosphate as a float.

U.S. Pat. Nos. 4,364,824 and 2,372,843 supra, describe a flotation process for removing carbonate mineral impurities. The process employs salts of sulfonated linear fatty acids as a carbonate mineral collector and a phosphate depressant, such as polyphosphate, metaphosphate, pyrophosphate or orthophosphate, to remove carbonate minerals in the overflow and to collect the phosphate concentrate in the underflow.

Lehr et al in U.S. Pat. No. 4,287,053, assigned to the assignee of the present invention, describe a phosphate ore beneficiating process in which phosphate ores containing carbonate mineral impurities are subjected to froth flotation in the presence of phosphate depressants, said depressants comprising alkyl diphosphonic acids, and a carbonate collector, said collector comprising fatty acids, removing the separated carbonate minerals from the overflow, and recovering the phosphate value in the underflow.

Lehr et al supra also teach that, in practicing their flotation method, the phosphate ores containing siliceous gangues preferably is first beneficiated by conventional techniques, such as the "double float" or "Crago" froth flotation process, to concentrate the phosphate values. Subsequently, the phosphate concentrate containing carbonate mineral impurities is subjected to a final stage of flotation employing the method of the said invention to remove carbonate minerals and produce a salable product. See for example, U.S. Pat. No. 4,287,053 supra, column 2, lines 16–24.

This method of Lehr et al works well when dolomite is unweathered and evenly distributed in the different size fractions of the flotation feed, or when dolomite content is particularly high in the fine-size fractions (for example, −100 +150 mesh, −150 +200 mesh, −200 +270 mesh, etc.). However, their method is fraught with difficulties when applied to some phosphate ore containing coarse, weathered dolomite in the flotation feed, such as that from central and south Florida. A phosphate concentrate having satisfactory $P_2O_5$ grade and MgO content cannot be obtained with reasonable recovery efficiency using the conventional Crago process, followed by Lehr's diphosphonic acid depressant process. The coarse, weathered dolomite carried over from the phosphate rougher flotation of the Crago process was difficult to float in the carbonate flotation stage using Lehr's work. Therefore, the present invention is intended to beneficiate this and other similar types of phosphate ores which contain coarse, weathered dolomite in the flotation feed.

SUMMARY OF THE INVENTION

The present invention is directed to an effective beneficiation process for upgrading a phosphate ore containing coarse, weathered dolomite in the flotation feed. The said flotation feed may be either (1) the regular flotation feed fraction prepared from the weathered dolomitic phosphate ore by the conventional washing and sizing methods, or (2) the flotation feed prepared from the pebble size fraction of weathered dolomitic phosphate ore by conventional grinding and sizing methods known in the art. The method of the subject invention includes the steps of:

(a) conditioning the flotation feed at about pH 8.5 to 10 with about 0.3 kg to 2 kg fatty acid and 0 kg to 4 kg fuel oil per ton of feed (feed as herein and subsequently indicated is amount of feed used in the rougher flotation stage);

(b) collecting the phosphate values and some silica and dolomite impurities as rougher concentrate from the overflow;

(c) subjecting the rougher concentrate to one or more cleaner flotations without additional flotation reagents, and rejecting coarse, weathered dolomite and some silica in the underflow;

(d) removing the fatty acid and fuel oil from the cleaner phosphate concentrate of step (c) with about 0.2 kg to 2 kg $H_2SO_4$ per ton of feed;

(e) further removing additional silica from the overflow in the amine flotation circuit with about 0.03 kg to 0.2 kg amine per ton of feed; and (f) subjecting phosphate concentrate (which contains fine dolomite particles) to carbonate flotation circuit in the presence of about 0.03 kg to 0.4 kg alkyl diphosphonic acid per ton of feed as a phosphate mineral depressant and 0.1 kg to 2 kg fatty acid per ton of feed as a dolomite collector, removing the separated dolomite as waste from the overflow, and recovering the phosphate values from the underflow.

The gist underlying the concept of the instant invention is that the practice of step (c) supra "sets up" the remaining material for further beneficiation in a mode such that step (f) supra can work effectively thereupon. Additionally, in practicing the present invention, step (e) supra can be eliminated if the amount of silica present in the phosphate concentrate from step (c) supra is insignificant.

BRIEF DESCRIPTION OF THE DRAWINGS

The present invention will be better understood from a consideration of the following description taken in connection with the accompanying drawings in which.

DETAILED DESCRIPTION OF THE INVENTION INCLUDING THE PREFERRED EMBODIMENTS IN CONJUNCTION WITH THE DETAILED DESCRIPTION OF THE FIGURES

The present invention provides an effective beneficiating process for concentrating phosphate values from a phosphate ore containing coarse, weathered dolomite in the flotation feed, such as that found in sedimentary deposits in central and south Florida. The said flotation feed can be the regular flotation feed fraction prepared from the weathered dolomitic phosphate ore by the conventional washing and sizing methods, or the flotation feed prepared from the pebble size fraction of weathered dolomitic phosphate ore by conventional grinding and sizing techniques known in the art. A particle size smaller than about 28 mesh is preferably used as the flotation feed for the present flotation process. With larger particle size, an appreciable amount of the gangue minerals may remain locked with the apatite. Furthermore, the larger particles are difficult to float, not only for dolomite, but also for phosphate minerals. Very small particles, e.g., smaller than about 400 mesh, are removed by a desliming process. Although the slime may contain phosphate value, their relatively large consumption of reagents make their beneficiation economically unattractive in relation to recoverable values of $P_2O_5$.

In flotation tests of the feed containing coarse, weathered dolomite, it is found that a phosphate concentrate having satisfactory $P_2O_5$ grade and MgO content (e.g., less than 1% MgO) cannot be obtained with reasonable recovery efficiency using the conventional Crago process, followed by TVA's carbonate separation process (i.e., Lehr et al process, supra). However, with certain modifications which lead to the present instant invention, a phosphate ore containing coarse, weathered dolomite in the flotation feed can be successfully processed.

Figure 1:
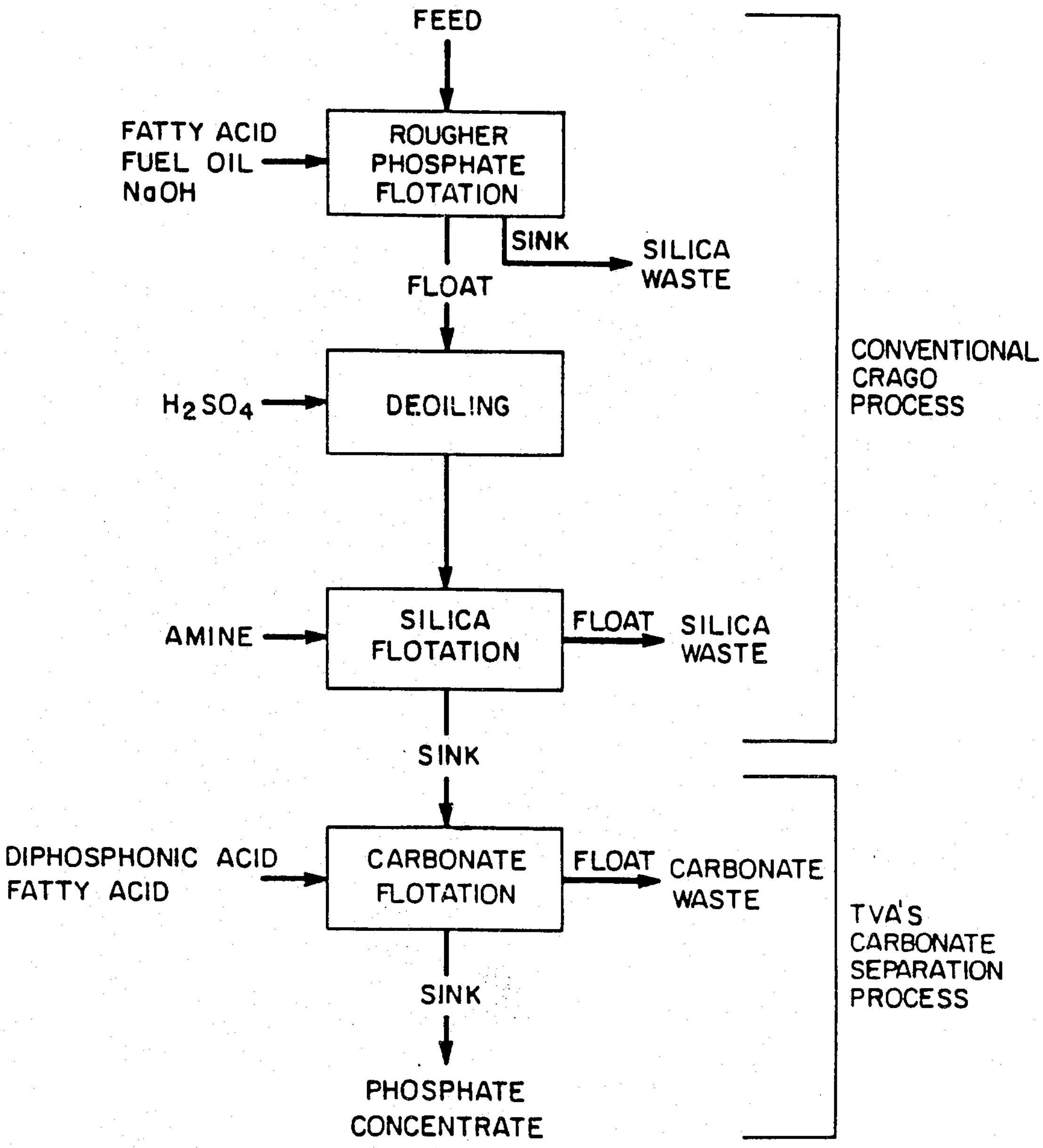
FIG. 1 is a flowsheet using the conventional Crago process followed by TVA's carbonate separation process (the process of Lehr et al supra). The flotation feed is first subjected to rougher phosphate flotation with fatty acid, fuel oil, and NaOH. The float from the rougher phosphate flotation is then deoiled in the deoiling stage with sulfuric acid, and then subjected to silica flotation with amine. After this conventional Crago process, the phosphate concentrate from the sink is subjected to TVA's carbonate separation process supra in which alkyl diphosphonic acid is used as a phosphate depressant and fatty acid as a dolomite collector. This beneficiation procedure, although a significant advancement of the art as described in Lehr U.S. Pat. No. 4,287,053 supra, does not work well with the feed materials herein contemplated because the coarse, weathered dolomite carried over from the rougher phosphate flotation stage of the Crago process was difficult to float in the carbonate flotation using the work of Lehr et al supra.

The flotation scheme using the conventional Crago process followed by TVA's carbonate separation process supra is shown in FIG. 1. As stated above, the beneficiation result is poor when the flotation feed contains coarse, weathered dolomite. Using this method, the flotation feed, prepared with conventional washing and sizing techniques or with conventional grinding and classification methods, is first conditioned with fatty acid, fuel oil and NaOH, and subjected to flotation of phosphate in the rougher flotation stage. The float from the rougher phosphate flotation is then deoiled in the deoiling stage with sulfuric acid, and then refloated with amine reagents in the silica flotation stage to remove silica which either floated or was trapped in the rougher float. After this conventional Crago process, the phosphate concentrate is then subjected to carbonate flotation in the carbonate flotation stage using TVA's carbonate separation process supra. In TVA's carbonate separation process, alkyl diphosphonic acid is used as the phosphate mineral depressant and fatty acid as the dolomite collector to remove dolomite in the overflow and to recover the phosphate values in the underflow. This beneficiation of using the conventional Crago process followed by TVA's carbonate separation process supra does not work well because the coarse, weathered dolomite carried over from the rougher phosphate flotation stage of the Crago process was difficult to float in TVA's carbonate separation stage.

Figure 2:
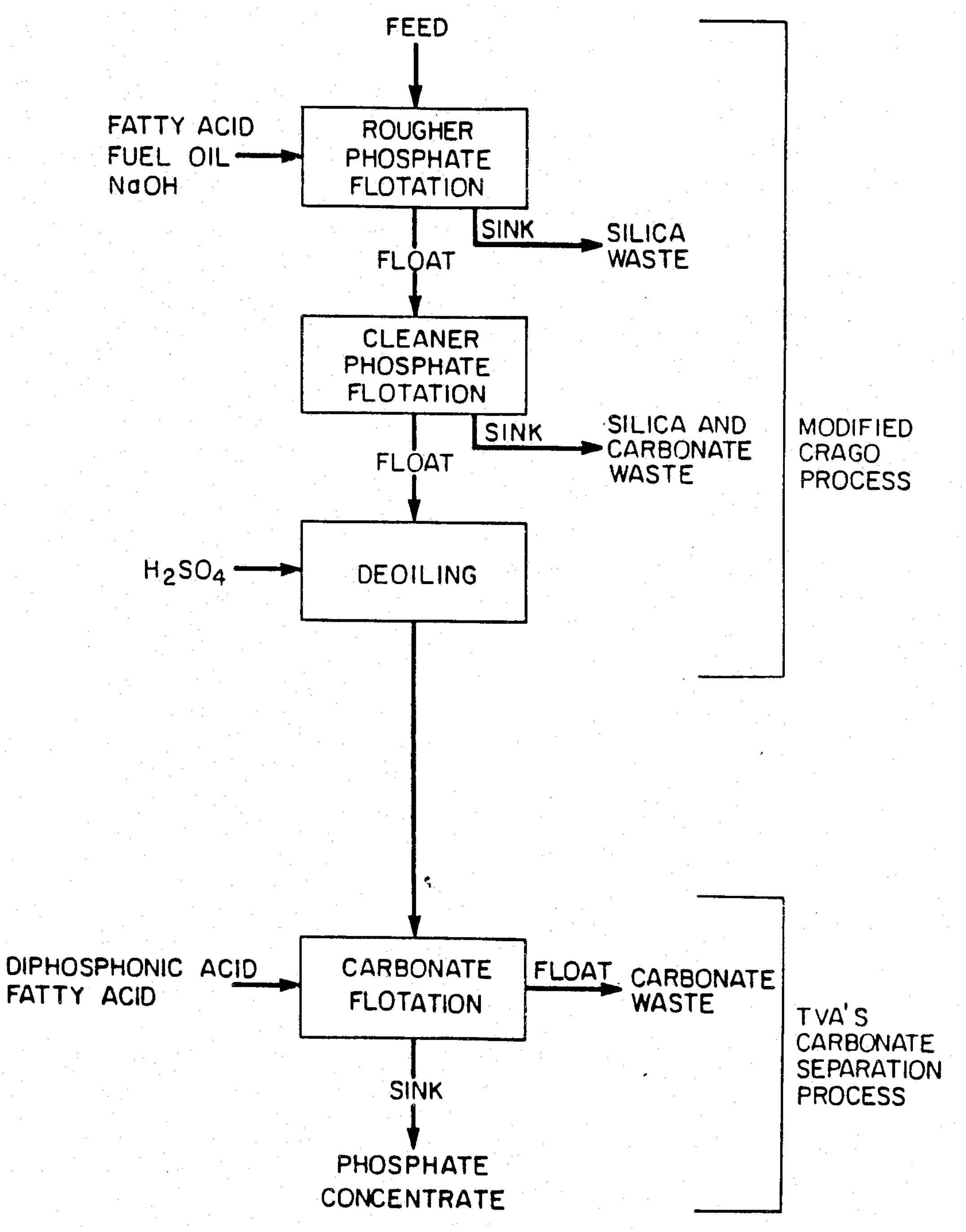
FIG. 2 is the flotation procedure used in the present invention. The flotation feed is first subjected to rougher flotation as similar to that performed in the conventional Crago process. As differing from the prior art, the rougher float from the rougher the flotation stage is returned to flotation cell and subjected to one or more cleaner phosphate flotations wherein the coarse, weathered dolomite and some silica carried over from the rougher phosphate flotation stage are rejected in the underflow. The process is then subjected to deoiling with sulfuric acid, silica flotation with amine and carbonate flotation with alkyl diphosphonic acid and fatty acid, with the second stage a "back half" of the "double-float" process of silica flotation with amine normally eliminated therefrom.
Figure 3:
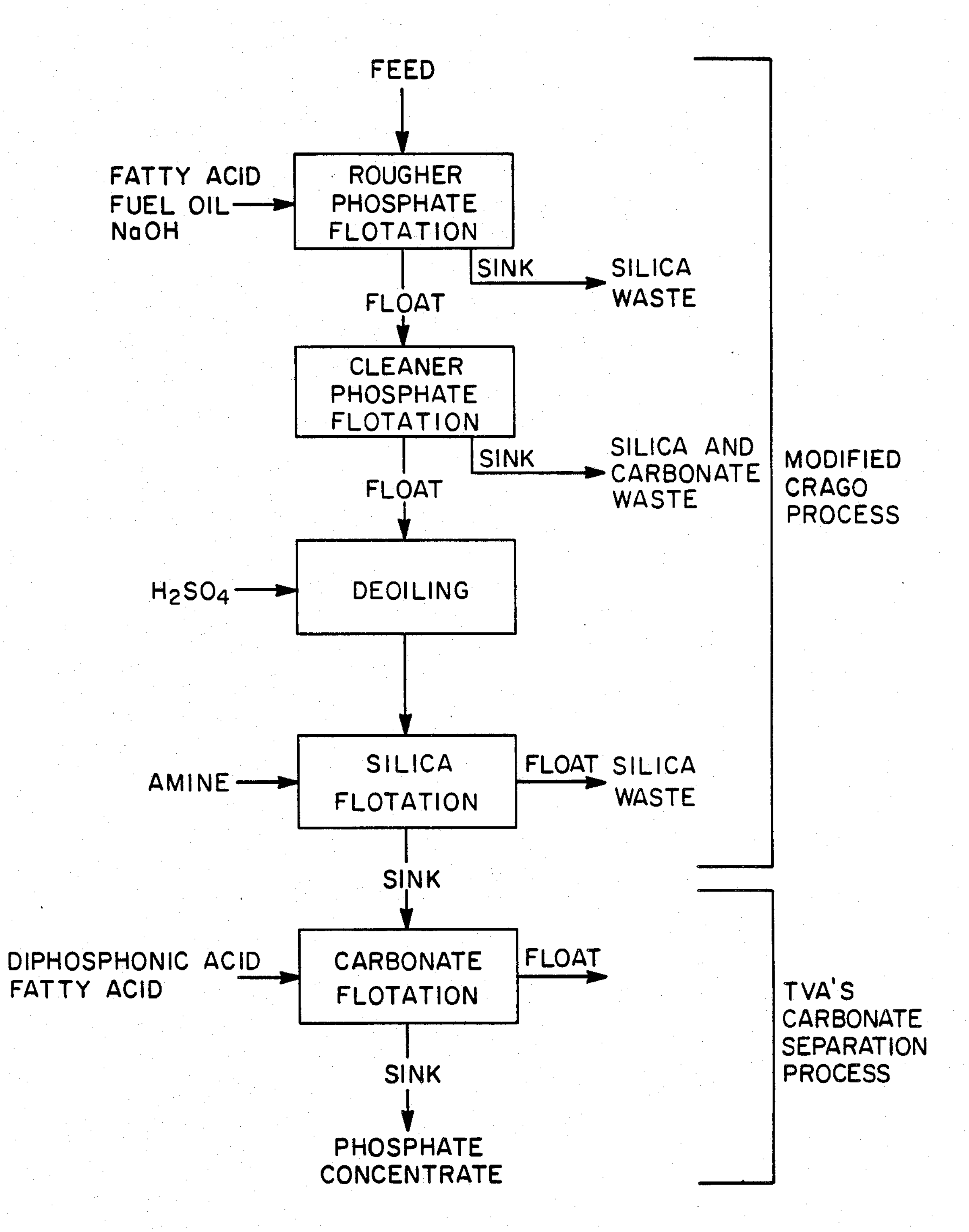
FIG. 3 shows the flotation procedure as in FIG. 2 supra, but in the alternate embodiment of the instant invention wherein a silica flotation stage is included. The invention parameters for this alternate embodiment are shown infra in the second tabulation on page 23.

The general flotation procedure used in the present invention is shown in FIG. 2. The prepared flotation feed, which is about $-28$ and $+400$ mesh in size, is first subjected to rougher phosphate flotation as similar to that performed in the conventional Crago process. The flotation feed is conditioned at about pH 8.5 to 10 with about 0.3 kg to 2 kg fatty acid and 0 to 4 kg fuel oil per ton of feed. The phosphate values with some silica and dolomite impurities are then collected from the overflow. The gist of the present invention, which differs from prior arts, is that the rougher concentrate from the rougher flotation stage, as shown in FIG. 2, is returned to flotation cell and subjected to one or more cleaner flotations in the cleaner phosphate flotation stage wherein the coarse, weathered dolomite and some silica carried over from the rougher phosphate flotation stage are rejected in the underflow. Without this additional cleaner phosphate flotation stage, the coarse, weathered dolomite particles would end up at the final phosphate product and result in the lower grade, the poor recovery or even lower grade with poor recovery.

The phosphate concentrate from the cleaner phosphate flotation stage is further deoiled with about 0.2 kg to 2 kg $H_2SO_4$ per ton of feed to remove the fatty acid and fuel oil reagents. If desirable or deemed necessary, any additional silica may be removed in a silica flotation stage using about 0.03 kg to 0.2 kg amine per ton of feed, although in the preferred embodiment of the instant invention this "back-half" of the "double-float" process normally is eliminated. Finally, the phosphate concentrate which still contains significant amounts of fine dolomite particle is subjected to carbonate flotation using TVA's carbonate separation process supra wherein about 0.03 kg to 0.4 kg alkyl diphosphonic acid per ton of feed as a phosphate mineral depressant and 0.1 kg to 2 kg fatty acid per ton of feed as a dolomite collector. The fine dolomite particles are rejected as waste from the overflow and the phosphate concentrate is recovered as final product from the underflow.

For flotation feed samples prepared from weathered dolomitic phosphate pebble, the $SiO_2$ content is much lower than that of regular flotation feed. Therefore, the silica carried over from the rougher phosphate flotation stage may be satisfactorily removed in the cleaner phosphate flotation stage. Therefore, in practicing the present invention, the silica flotation stage with amine reagents, as shown in FIG. 2, can be eliminated. The flotation scheme in this case will include rougher phosphate flotation stage, cleaner flotation stage, deoiling stage, and carbonate flotation stage.

EXAMPLES

The present invention is further illustrated by the following examples. In order that those skilled in the art may better understand how the present invention can be practiced, the following examples are given by way of illustration and not necessarily by way of limitation. It is noted that Examples I and II herein are offered in the manner of negative examples, in that they illustrate what happens when the process of the instant invention is practiced without the step of cleaner phosphate flotation. Examples III to V show the first embodiment that some silica still remained in the phosphate concentrate after deoiling stage, and silica flotation with amine is deemed desirable. Examples VI to VII, however, show the second and preferred embodiment of the invention wherein the silica flotation with amine can be eliminated because the silica content in the phosphate concentrate is insignificant after deoiling stage.

EXAMPLE I

A Florida phosphate ore containing coarse, weathered dolomite in the regular flotation feed was used in the example. The minus 28- plus 150-mesh fraction which was used as flotation feed contained about 17.5 percent CaO, 9.5 percent $P_2O_5$, 2.4 percent MgO, and 60 percent $SiO_2$. The dolomite content was particularly high in the plus 35-mesh and minus 150-mesh fractions. These fractions consisted of more than 6 percent MgO, while the minus 48- plus 150-mesh fraction consisted of less than 2 percent MgO.

In flotation experiments, a 520-gram sample was scrubbed at about 50 percent solid for 10 minutes and then screened to remove the minus 400-mesh slime fraction (about 4%). The deslimed feed (about 500 grams) then was processed with the conventional Crago double-float process, followed by TVA's carbonate separation process as shown in FIG. 1. The sample was conditioned at a pulp density of 65 percent solid for 2.5 minutes with 0.5 kg fatty acid and 1.0 kg fuel oil per ton of feed. The pH was adjusted to 9.5 with NaOH. The pulp then was diluted with tap water and floated to recover the phosphate value in the rougher float and to remove silica as waste in the rougher sink.

After the rougher phosphate flotation, the rougher concentrate was scrubbed with 0.75 kg $H_2SO_4$ per ton of feed at about 25 percent solid as "deoiling" agent to remove fatty acid and fuel oil from the phosphate mineral surface. The pulp was deslimed, and then returned to flotation cell and conditioned for 0.5 minutes with 0.15 kg dodecylamine hydrochloride per ton of feed. Additional silica was floated as waste.

The phosphate concentrate containing the dolomite impurity from the above conventional Crago process was treated further with TVA's carbonate separation process. The sample first was conditioned for one minute at about 35 percent solid with 0.1 kg hydroxyethylidene diphosphonic acid (60% active content) per ton of feed as phosphate mineral depressant, and then for an additional 2.5 minutes with 0.5 kg oleic acid per ton of feed as dolomite collector. The pH was adjusted to 6.5 with NaOH. After conditioning, the pulp was diluted with tap water. The dolomite particles were refloated as waste, and the phosphate mineral remained in the sink as concentrate. The results are shown in Table I below. The $P_2O_5$ recovery was 89.7 percent, but the product still contained 2.1 percent MgO which was unsatisfactory.

TABLE I

| Product | Wt % | Analysis, % CaO | $P_2O_5$ | MgO | $SiO_2$ | Distribution, % CaO | $P_2O_5$ | MgO | $SiO_2$ |
|---|---|---|---|---|---|---|---|---|---|
| Phosphate flotation | | | | | | | | | |
| Rougher sink | 61.46 | 4.8 | 1.1 | 2.0 | 85.8 | 16.5 | 6.8 | 54 | 88.7 |
| Silica float | 7.17 | 6.3 | 3.4 | 1.7 | 74.6 | 2.5 | 2.5 | 5 | 9.0 |
| Carbonate float | 2.22 | 28.2 | 4.4 | 13.9 | 0.2 | 3.5 | 1.0 | 14 | 0.0 |
| Phosphate sink | 29.15 | 47.4 | 30.3 | 2.1 | 4.6 | 77.4 | 89.7 | 27 | 2.3 |
| Head | 100.00 | 17.8 | 9.8 | 2.3 | 59.4 | 99.9 | 100.0 | 100 | 100.0 |

EXAMPLE II

The phosphate ore flotation was performed as outlined in Example I supra except that the dosage of oleic acid was increased from 0.5 kg per ton to 1.0 kg per ton of feed in the carbonate flotation stage. The pH at the end of conditioning of the carbonate flotation circuit was 6.4. The results are shown in Table II below. The $P_2O_5$ recovery was 76.3%, and the product still contained 1.9 percent MgO which was also unacceptable.

TABLE II

| Product | Wt % | Analysis, % CaO | $P_2O_5$ | MgO | $SiO_2$ | Distribution, % CaO | $P_2O_5$ | MgO | $SiO_2$ |
|---|---|---|---|---|---|---|---|---|---|
| Phosphate flotation | | | | | | | | | |
| Rougher sink | 61.27 | 4.2 | 0.9 | 2.0 | 86.9 | 14.7 | 5.8 | 53 | 88.4 |
| Silica float | 8.31 | 12.2 | 6.3 | 1.9 | 65.5 | 5.8 | 5.5 | 7 | 9.1 |
| Carbonate float | 6.28 | 39.5 | 18.8 | 7.4 | 3.2 | 14.2 | 12.4 | 20 | 0.3 |
| Phosphate sink | 24.14 | 47.3 | 30.0 | 1.9 | 5.6 | 65.3 | 76.3 | 20 | 2.2 |
| Head | 100.00 | 17.5 | 9.5 | 2.3 | 60.2 | 100.0 | 100.0 | 100 | 100.0 |

EXAMPLE III

The phosphate ore flotation was performed according to the procedure shown in FIG. 2. The detailed flotation conditions were the same as outlined in Example I supra except that the rougher phosphate concentrate was returned to flotation cell, diluted with tap water and refloated phosphate minerals in order to reject coarse, weathered dolomite and some silica in the underflow. In addition, the conditioning pH in the carbonate flotation stage was 6.1. The phosphate product contained 31.9 percent $P_2O_5$ and only 0.8 percent MgO; the $P_2O_5$ recovery was 77.7 percent. The detailed flotation results are shown in Table III below.

TABLE III

| Product | Wt % | Analysis, % CaO | $P_2O_5$ | MgO | $SiO_2$ | Distribution, % CaO | $P_2O_5$ | MgO | $SiO_2$ |
|---|---|---|---|---|---|---|---|---|---|
| Phosphate flotation | | | | | | | | | |
| Rougher sink | 62.89 | 4.4 | 1.0 | 1.9 | 86.6 | 15.8 | 6.7 | 54 | 89.5 |
| Cleaner sink | 9.54 | 25.2 | 10.9 | 5.8 | 38.0 | 13.8 | 11.0 | 25 | 6.0 |
| Silica float | 2.40 | 11.3 | 5.4 | 2.3 | 60.9 | 1.5 | 1.4 | 3 | 2.4 |
| Carbonate float | 2.26 | 34.6 | 13.2 | 9.7 | 3.0 | 4.5 | 3.2 | 10 | 0.1 |
| Phosphate sink | 22.91 | 49.1 | 31.9 | 0.8 | 5.4 | 64.4 | 77.7 | 8 | 2.0 |
| Head | 100.00 | 17.5 | 9.4 | 2.2 | 60.9 | 100.0 | 100.0 | 100 | 100.0 |

EXAMPLE IV

The phosphate ore flotation was performed as outlined in Example III, except that the conditioning pH in the carbonate flotation stage was increased to 6.6. The flotation results are shown in Table IV which indicates the phosphate product contained 31.2 percent $P_2O_5$ and only 0.9 percent MgO; the $P_2O_5$ recovery was 79.7 percent.

TABLE IV

| Product | Wt % | Analysis, % CaO | $P_2O_5$ | MgO | $SiO_2$ | Distribution, % CaO | $P_2O_5$ | MgO | $SiO_2$ |
|---|---|---|---|---|---|---|---|---|---|
| Phosphate flotation | | | | | | | | | |
| Rougher sink | 62.35 | 4.7 | 1.3 | 2.2 | 85.9 | 16.9 | 8.6 | 58 | 80.5 |
| Cleaner sink | 9.16 | 22.5 | 9.3 | 5.5 | 42.4 | 11.9 | 9.0 | 21 | 6.4 |
| Silica float | 2.48 | 8.3 | 3.9 | 1.9 | 70.7 | 1.2 | 1.0 | 2 | 2.9 |
| Carbonate float | 1.87 | 30.0 | 8.5 | 12.2 | 2.8 | 3.2 | 1.7 | 10 | 0.1 |
| Phosphate sink | 24.14 | 47.9 | 31.2 | 0.9 | 5.3 | 66.8 | 79.7 | 9 | 2.1 |

TABLE IV-continued

| Product | Wt % | Analysis, % CaO | $P_2O_5$ | MgO | $SiO_2$ | Distribution, % CaO | $P_2O_5$ | MgO | $SiO_2$ |
|---|---|---|---|---|---|---|---|---|---|
| Head | 100.00 | 17.3 | 9.4 | 2.4 | 60.5 | 100.0 | 100.0 | 100 | 100.0 |

EXAMPLE V

The phosphate ore flotation was performed as outlined in Example III, except that two phosphate concentrates from the cleaner phosphate flotation stage were combined and subjected to subsequent deoiling, silica flotation, and carbonate flotation. Therefore, the reagents used in these subsequent stages were decreased by half wherein $H_2SO_4$ decreased to 0.38 kg per ton, dodecylamine hydrochloride decreased to 0.075 kg per ton, hydroxyethylidene diphosphonic acid (60% active content) decreased to 0.075 kg per ton, and oleic acid to 0.25 kg per ton of feed. The conditioning pH in carbonate flotation stage was 6.6 and the pulp was conditioned at 65 percent solid. The results are shown in Table V. The phosphate product contained 32.8 percent $P_2O_5$ and 0.8 percent MgO. The $P_2O_5$ recovery was 76.8 percent.

TABLE V

| Product | Wt % | Analysis, % CaO | $P_2O_5$ | MgO | $SiO_2$ | Distribution, % CaO | $P_2O_5$ | MgO | $SiO_2$ |
|---|---|---|---|---|---|---|---|---|---|
| Phosphate flotation | | | | | | | | | |
| Rougher sink | 60.43 | 4.8 | 1.1 | 2.3 | 84.3 | 16.5 | 6.8 | 56 | 85.4 |
| Cleaner sink | 11.44 | 22.6 | 9.5 | 5.6 | 22.6 | 14.7 | 11.1 | 26 | 10.6 |
| Silica float | 3.00 | 14.0 | 6.8 | 2.6 | 55.5 | 2.4 | 2.1 | 3 | 2.8 |
| Carbonate float | 2.20 | 35.5 | 14.5 | 8.8 | 4.0 | 4.4 | 3.2 | 8 | 0.1 |
| Phosphate sink | 22.93 | 47.5 | 32.8 | 0.8 | 2.8 | 62.0 | 76.8 | 7 | 1.1 |
| Head | 100.00 | 17.6 | 9.8 | 2.5 | 59.6 | 100.0 | 100.0 | 100 | 100.0 |

EXAMPLE VI

A Florida phosphate ore containing weathered dolomite in the pebble fraction was used in this example. The pebble fraction, which contained undesirable dolomite mineral, was stage-ground in a rod mill to prepare a minus 28- plus 400-mesh flotation feed. This feed contained about 37 percent CaO, 22.3 percent $P_2O_5$, 1.9 percent MgO and 24 percent $SiO_2$, and about 58 percent of total MgO content was presented in the plus 65-mesh fraction.

In flotation experiment, a 500-gram flotation feed was conditioned at a pulp density of 65 percent for 2.5 minutes with 0.75 kg fatty acid and 1.5 kg fuel oil per ton of feed. The pH was adjusted to 9.3 with NaOH. The pulp then was diluted with tap water and floated to recover phosphate value in the rougher float and to remove silica as wate in the rougher sink.

After the rougher phosphate flotation, the rougher phosphate concentrate was returned to flotation cell, diluted with tap water and refloated phosphate minerals in the float and rejected coarse, weathered dolomite and some silica in the sink. The same cleaner phosphate flotation procedure was repeated once to remove additional coarse dolomite as waste. After cleaner phosphate flotation step (two times), the phosphate concentrate was subjected to deoiling with 1.5 kg $H_2SO_4$ per ton of feed. No silica flotation with amine was performed, because most of the free silica has been removed in the rougher and cleaner phosphate flotation. The deoiled phosphate concentrate was then subjected to carbonate flotation with 0.15 kg hydroxyethylidene diphosphonic acid (60% active content) and 1.5 kg oleic acid per ton of feed. The conditioning pH at the carbonate separation circuit was 5.4. The flotation results are shown in Table VI. The final phosphate product contained 30.4 percent $P_2O_5$ and only 0.8 percent MgO. The $P_2O_5$ recovery was 81.4 percent.

TABLE VI

| Product | Wt % | Analysis, % CaO | $P_2O_5$ | MgO | $SiO_2$ | Distribution, % CaO | $P_2O_5$ | MgO | $SiO_2$ |
|---|---|---|---|---|---|---|---|---|---|
| Phosphate flotation | | | | | | | | | |
| Rougher sink | 20.9 | 10.1 | 3.8 | 2.6 | 78.2 | 5.8 | 3.6 | 29 | 67.9 |
| First cleaner sink | 7.1 | 23.1 | 11.2 | 3.7 | 45.8 | 4.5 | 3.6 | 14 | 13.5 |
| Second cleaner sink | 4.6 | 31.6 | 16.9 | 3.8 | 30.1 | 4.0 | 3.5 | 9 | 5.8 |
| Carbonate float | 7.8 | 44.1 | 22.7 | 5.2 | 3.7 | 9.3 | 7.9 | 22 | 1.2 |
| Phosphate sink | 59.6 | 46.9 | 30.4 | 0.8 | 4.7 | 76.4 | 81.4 | 26 | 11.6 |
| Head | 100.0 | 36.6 | 22.3 | 1.9 | 24.1 | 100.0 | 100.0 | 100 | 100.0 |

EXAMPLE VII

The phosphate ore flotation feed and flotation procedure were the same as that outlined in Example VI supra except that the oleic acid used in the carbonate flotation stage was 1.0 kg per ton of feed, and the conditioning pH was 5.6. The flotation results are shown in Table VII which indicates that the phosphate product contained 30.3 percent $P_2O_5$ and 0.9 percent MgO; the $P_2O_5$ recovery was 85.7 percent.

TABLE VII

| Product | Wt % | Analysis, % CaO | $P_2O_5$ | MgO | $SiO_2$ | Distribution, % CaO | $P_2O_5$ | MgO | $SiO_2$ |
|---|---|---|---|---|---|---|---|---|---|
| Phosphate flotation | | | | | | | | | |
| Rougher sink | 19.3 | 9.8 | 3.8 | 2.5 | 78.4 | 5.1 | 3.3 | 25 | 63.1 |

TABLE VII-continued

| Product | Wt % | Analysis, % CaO | $P_2O_5$ | MgO | $SiO_2$ | Distribution, % CaO | $P_2O_5$ | MgO | $SiO_2$ |
|---|---|---|---|---|---|---|---|---|---|
| First cleaner sink | 5.6 | 18.0 | 8.8 | 3.2 | 58.0 | 2.7 | 2.2 | 9 | 13.5 |
| Second cleaner sink | 3.3 | 25.0 | 13.5 | 3.2 | 43.9 | 2.2 | 1.9 | 5 | 6.0 |
| Carbonate float | 8.3 | 41.6 | 18.7 | 7.2 | 4.3 | 9.3 | 6.9 | 31 | 1.5 |
| Phosphate sink | 63.6 | 47.2 | 30.3 | 0.9 | 6.0 | 80.7 | 85.7 | 30 | 15.9 |
| Head | 100.1 | 37.2 | 22.5 | 1.9 | 24.0 | 100.0 | 100.0 | 100 | 100.0 |

The results of Examples III to VII illustrate that the phosphate ore containing coarse, weathered dolomite in flotation feed can be effectively beneficiated by the process of the present invention, wherein the coarse, weathered dolomite carried over from the rougher phosphate flotation stage can be rejected in one or more cleaner phosphate flotations without addition of reagents. The fine dolomite particles are further removed using TVA's carbonate separation process. Without utilization of the present invention as those indicated by Examples I and II, the coarse, weathered dolomite carried over from the rougher phosphate flotation stage is ended up in the final phosphate concentrate, and resulted in poor and unacceptable phosphate product.

INVENTION PARAMETERS

After sifting and winnowing through the data herein presented as well as other results and operation of my novel process for beneficiation of phosphate ores containing coarse, weathered dolomite, the operating and preferred parameters and variables for flotation separation of the present invention are shown in the following two tabulations. The first tabulation below shows the invention parameters of my preferred embodiment wherein the silica flotation stage is eliminated, while the second tabulation below shows the invention parameters of the alternate embodiment of my invention wherein the silica flotation stage is included.

| Variables | First Tabulation of Parameters: Operating Range | First Tabulation of Parameters: Preferred Range | Second Tabulation of Parameters: Operating Range | Second Tabulation of Parameters: Preferred Range |
|---|---|---|---|---|
| Feed Size | −16 mesh +10 micron | −28 mesh +400 mesh | −16 mesh +10 micron | −28 mesh +400 mesh |
| Rougher phosphate flotation | | | | |
| Conditioning pH | 8-11 | 8.5-10 | 8-11 | 8.5-10 |
| Conditioning density (solid) | 20-74% | 60-70% | 20-74% | 60-70% |
| Fatty acid (kg/ton) | 0.3-2 | 0.3-1.5 | 0.3-2 | 0.3-1.5 |
| Fuel oil | 0-4 | 0.2-3 | 0-4 | 0.2-3 |
| Cleaner phosphate flotation Reagents | 0 | 0 | 0 | 0 |
| Deoiling $H_2SO_4$ (kg/ton) | 0.2-2 | 0.5-1.5 | 0.2-2 | 0.5-1.5 |
| Silica flotation Amine (kg/ton) | | | 0.03-0.2 | 0.05-0.15 |
| Carbonate flotation | | | | |
| Conditioning pH | 5-8 | 5-7 | 5-8 | 5-7 |
| Conditioning density (solid) | 20-74 | 30-70 | 20-74 | 30-70 |
| Diphosphonic acid (kg/ton) | 0.03-0.4 | 0.05-0.3 | 0.03-0.4 | 0.05-0.3 |
| Fatty acid (kg/ton) | 0.1-2 | 0.2-1.5 | 0.1-2 | 0.2-1.5 |

While I have shown and described particular embodiments of my invention, modifications and variations thereof will occur to those skilled in the art. I wish it to be understood, therefore, that the appended claims are intended to cover such modifications and variations which are within the true scope and spirit of my invention.

What I claim as new and desire to secure by Letters Patent of the United States is:

1. An ore beneficiation process which comprises the steps of:

(a) subjecting, within a pH ranging from about 8.0 to about 11 as rougher phosphate flotation feed a phosphate ore of size fraction minus 16-mesh plus 10 micron containing coarse, weathered dolomite impurities and containing greater than about 1 percent MgO, to a rougher phosphate flotation step in the presence of from about 0.3 kg to about 2 kg of fatty acid and in amounts ranging upwards to about 4 kg of fuel oil per ton of said flotation feed, said coarse, weathered dolomite being of particle size about plus 48-mesh or about plus 65-mesh;

(b) collecting substantially the phosphate values along with only minor amounts of both silica and dolomite impurities as phosphate rougher concentrate from the float and rejecting substantial amounts of the silica waste in the sink of step (a) supra;

(c) subjecting said phosphate rougher concentrate collected in step (b) supra to at least one cleaner flotation step to thereby reject substantial amounts of said coarse, weathered dolomite and only minor amounts of silica in the sink thereof and recovering in the float therefrom phosphate cleaner concentrate, said at least one cleaner flotation step having aqueous media without additional floating agents added thereto and utilizing as reagent therein substantial amounts of residual fatty acid and fuel oil remaining in the float from step (b) supra;

(d) removing the fatty acid and fuel oil from said phosphate cleaner concentrate recovered in the float from step (c) supra by subjecting said concentrate to a deoiling step in the presence of from about 0.2 kg to about 2 kg of $H_2SO_4$ per ton of feed thereto;

(e) subjecting the resulting deoiled phosphate concentrate from step (d) supra to a carbonate flotation step in the presence of from about 0.03 kg to about 0.4 kg of alkyl diphosphonic acid per ton of feed, and from about 0.1 kg to about 2 kg fatty acid per ton of feed added thereto;

(f) removing the resulting separated dolomite from the float of step (e) supra; and (g) recovering as product the resulting phosphate values in the sink from step (e) supra;

2. The process of claim 1 wherein said phosphate ore utilized as rougher phosphate is of a size fraction minus 28-mesh plus 400-mesh.

3. The process of claim 1 wherein step (a) thereof said pH ranges from about 8.5 to about 10, said fatty acid ranges from about 0.3 kg to about 1.5 kg, and said fuel oil ranges from about 0.2 kg to about 3 kg; wherein step (d) thereof said sulfuric acid ranges from about 0.5 kg to about 1.5 kg; and wherein step (e) thereof said alkyl diphosphonic acid ranges from 0.05 kg to about 0.3 kg and said fatty acid ranges from about 0.2 kg to about 1.5 kg.

4. The process of claim 3 wherein said phosphate ore utilized as rougher phosphate is of a size fraction minus 28-mesh plus 400-mesh.

5. The process of claim 1 wherein the concentrate from step (d) thereof is introduced into a silica flotation step in the presence of from about 0.03 kg to about 0.2 kg of amine flotation reagent per ton of feed thereto to further remove additional silica from the float thereof.

6. The process of claim 5 wherein said phosphate ore utilized as rougher phosphate is of a size fraction minus 28-mesh plus 400-mesh.

7. The process of claim 5 wherein step (a) thereof said pH ranges from about 8.5 to about 10, said fatty acid ranges from about 0.3 kg to about 1.5 kg, and said fuel oil ranges from about 0.2 kg to about 3 kg; wherein step (d) thereof said sulfuric acid ranges from about 0.5 kg to about 1.5 kg; and wherein step (e) thereof said alkyl diphosphonic acid ranges from 0.05 kg to about 0.3 kg and said fatty acid ranges from about 0.2 kg to about 1.5 kg.

8. The process of claim 7 wherein said phosphate ore utilized as rougher phosphate is of a size fraction minus 28-mesh plus 400-mesh.

9. The process of claim 7 wherein the amount of amine reagent added to said silica flotation step along with said concentrate ranges from about 0.05 kg to about 0.15 kg per ton of feed.

10. The process of claim 9 wherein said phosphate ore utilized as rougher phosphate is of a size fraction minus 28-mesh plus 400-mesh.

* * * * *